April 17, 1951  M. A. POTTS  2,549,709
RACK CONSTRUCTION FOR ROASTERS
Filed Aug. 12, 1949  2 Sheets-Sheet 1
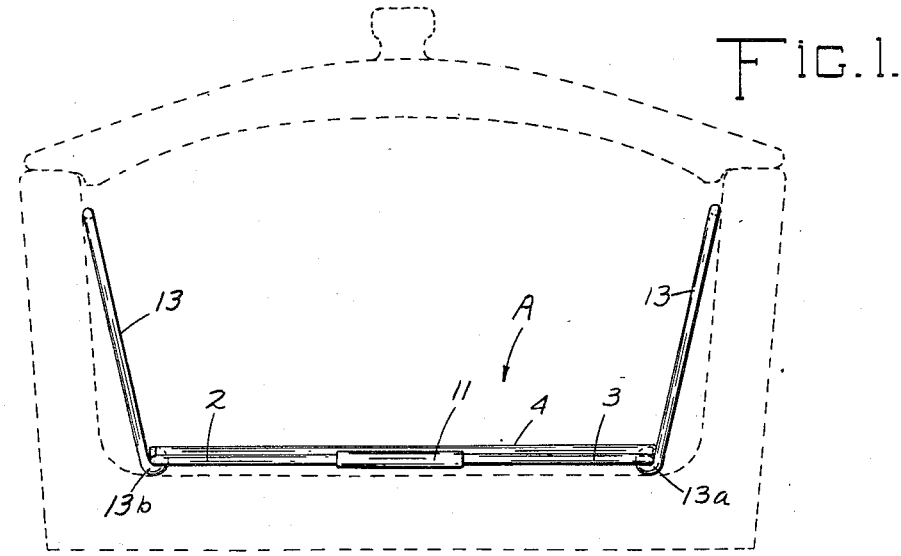
Fig.1.
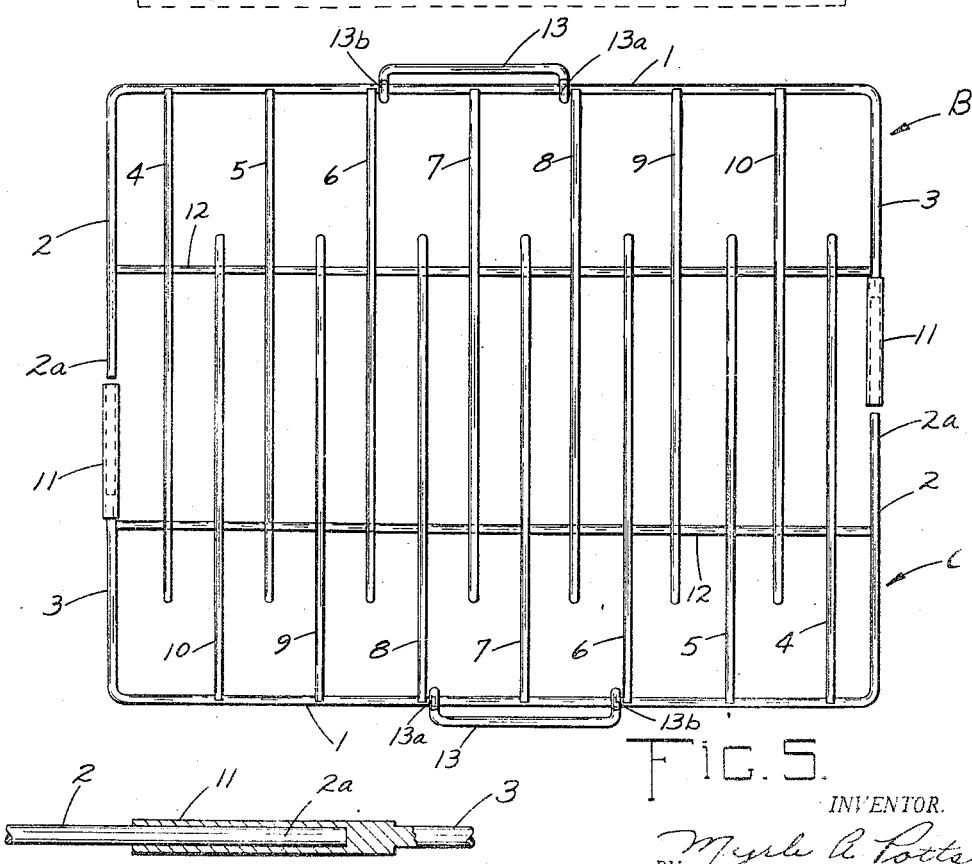
Fig.5.
Fig.6.
INVENTOR.
Myrle A. Potts
BY Robb & Robb
Attorneys Patented Apr. 17, 1951

2,549,709

UNITED STATES PATENT OFFICE 2,549,709

RACK CONSTRUCTION FOR ROASTERS

Myrle A. Potts, Parma Heights, Ohio, assignor of thirty-three and one-third per cent to Paul C. Potts and thirty-three and one-third per cent to Davis J. Parker, both of Parma, Ohio Application August 12, 1949, Serial No. 109,969

4 Claims. (Cl. 99—449)

My present invention comprises a novel cooking rack and lifter device adapted for roasting, grilling and similar cooking operations, especially designed for roasting or grilling of fish or fowl, and meat generally.

One of the primary objects of my invention is to provide such a cooking rack which is constructed of two identical complemental sections.

Another principal object of my invention is to provide such a rack in which the grill bars or rods of the complemental sections of the rack coact with one another when in assembled relation so that the free ends of said grill bars or rods perform the function of leg members or rest members for engaging the bottom of the pan or roaster or other surface upon which the cooking rack is to rest during the cooking operation whereby to support the cooking rack in a raised or spaced relation to such surface.

Another object of my invention is to provide such a cooking rack constructed of identical complemental sections which are telescopingly cooperable in assembled relation.

A further object of my invention is to provide such a cooking rack constructed of identical complemental sections, each section provided with a pivoted handle member, and the handle members arranged on opposite sides of the rack when the complemental sections are in cooperative relation.

A still further object of my invention is to provide such a rack constructed principally of heavy wire or rod members constituting the frame portion, the grill bars and the handle members.

A further object of my invention is to provide such a cooking rack comprising identical complemental sections and composed chiefly of heavy wire or rod members constituting the frame handles and grill bars and with one of the outer grill bars of each complemental section provided with means for telescopically receiving the free end of a grill bar of the other section.

In carrying my invention into practice, I provide a cooking rack or grill device comprising two complemental sections each consisting of frame and grill bar elements composed of heavy wire or rod members and each section having a pivoted handle member, all composed of similar heavy wire or rod members, and all of the rod members or heavy wire members utilized in the rack construction being preferably of uniform thickness so that manufacture of the devices of my invention is greatly simplified in reference to the material utilized and also in reference to the construction of identical complemental rack sections, thereby enabling the devices of my invention to be manufactured very cheaply and with a minimum amount of labor while providing a very satisfactory device for the purpose. The frame member of my rack device consisting of a single heavy wire or rod member, is bent to form the grill bars at opposite ends of each section and one of these end grill bar elements is provided with a sleeve to receive the end grill bar element of the complemental rack section.

One objective of my invention is to provide a cooking rack comprising complemental sections which may be manipulated by respective handles for lifting of the cooked meat out of the roasting pan when cooking and to separate the sections over a platter so as to deposit the cooked meat on the latter.

For a detailed description of my invention reference is now had to the accompanying drawings in which:

Figure 1 is a view in end elevation of a cooking rack embodying my invention, the same illustrated as when disposed in a roaster shown by dotted lines.

Figure 5 is a view similar to Figure 2 but showing the complemental sections with the end grill bars withdrawn from their telescoping relation.

Figure 6 is a section taken on the line 6—6 of Figure 2.

Figure 2:
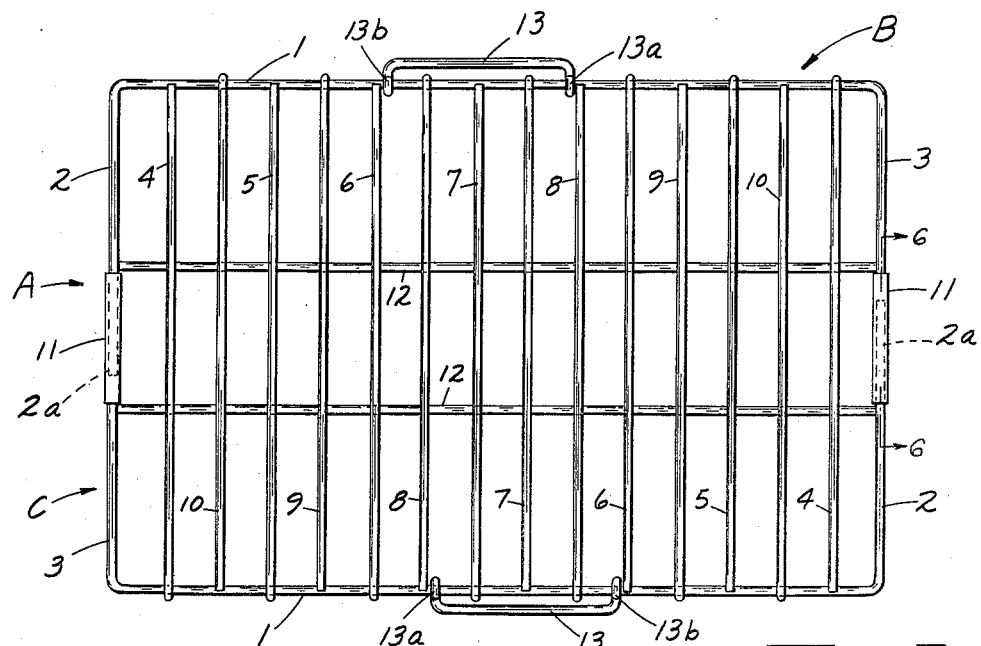
Figure 2 is a top plan view of the cooking rack embodying my invention showing the complemental sections of the rack in cooperative telescoped relation.

In the drawings, the cooking rack of my invention is generally designated by the letter A, the same comprising two complemental grill sections designated B and C respectively. It will be apparent from examination of Figures 2 and 5 particularly that the grill sections B and C are identical in all respects and that they are assembled in reversed or opposed relation to complete the cooking rack unit A as shown in assembled relation in Figure 2.

Each of the identical complemental rack or grill sections B and C comprises a frame member 1 comprising a heavy wire or light rod member bent to form the end grill bars 2 and 3 respectively at opposite ends of the respective grill section B or C. Each of the complemental sections B and C is further provided with identically arranged, spaced parallel, grill bars 4, 5, 6, 7, 8, 9, and 10 respectively, arranged intermediate the end grill bars 2 and 3 and parallel thereto, and one end of each of the grill bars 4, 5, 6, 7, 8, 9 and 10 is suitably secured to the frame member 1 as by welding.

It will be noted that the grill bar 4 of each section B or C is spaced from the grill bar 2 a distance which is less than the distance between the other grill bars 5, 6, 7, 8, 9, and 10, which are equidistantly spaced from each other, the grill bar 5 having a like equidistant spacing from the grill bar 4 and the grill bar 10 having a like equidistant spacing from the end grill bar 3.

The grill bar 3 of each section is provided with a sleeve element 11 at its free end for receiving the free end 2a of the complemental grill section B or C. Thus, the sleeve 11 and the end bar 3 of the grill section B receives the free end 2a of the end grill bar 2 of the grill section C and similarly the sleeve 11 and the grill bar 3 of the section C receives the end 2a of the end grill bar 2 of the grill section B.

Each of the grill sections B and C is preferably additionally provided with a cross bar 12 secured to the grill bars 2, 4, 5, 7, 8, 9, 10 and 3, intermediate the ends of the latter, the cross bars 12 extending substantially parallel to the portion of the frame member 1 intermediate the end bars 2 and 3 thereof.

Figure 3:
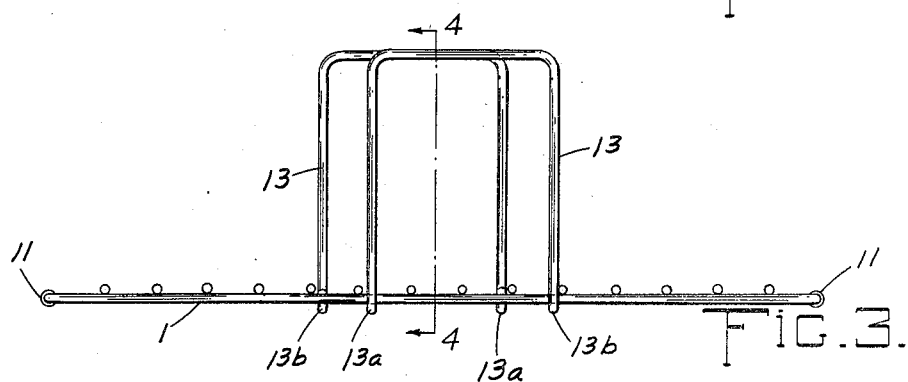
Figure 3 is a side elevation looking toward the bottom of Figure 2.
Figure 4:
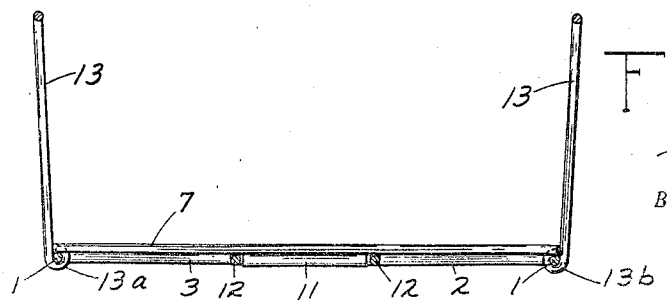
Figure 4 is a section taken on the line 4—4 of Figure 3.

Each of the sections B and C is provided with a respective handle member 13 comprising a heavy wire or rod member formed of substantial U shape as seen best in Figure 3. Each of the handle members is formed at its free end with loops 13a and 13b looped around the frame member 1 of the respective grill section B or C for pivotally connecting the handles 13 thereto as shown best in Figures 3 and 4.

All of the parts 1, 4, 5, 6, 7, 8, 9, 10, 12 and 13, comprise members made up of heavy wire or light rod which may preferably be of uniform thickness for all of said parts, and the part 1 being bent to form the grill bars 2 and 3 from the same piece of heavy wire or light rod. Likewise, the sleeves 11 are identical for each of the sections B and C. Thus, the materials for the manufacture of the grill or cooking rack units of my invention comprise simply heavy wire or rods of uniform thickness and uniform sleeve elements 11.

In the use of the cooking rack A of my invention the sections B and C may be readily assembled together by inserting the end 2a of the grill bar 2 of section B into the sleeve 11 on grill bar 3 of grill section C and inserting the end 2a of grill bar 2 of section C into the sleeve 11 on grill bar 3 of section B, the ends 2a sliding telescopingly into sleeves 11. It may be noted that the cross bars 12 may be of a length to just extend between the end grill bars 2 and 3 so that the cross bars 12, secured to the end grill bars 2 and 3 as by welding or the like, are in a common plane with the grill bars 2 and 3 and frame portion 1 intermediate the latter. The grill bars 4, 5, 6, 7, 8, 9, and 10, may be mounted to lie on top of the frame portion 1 and the cross bars 12 so as to be in a slightly higher plane, the said grill bars 4 to 10 being welded or otherwise suitably secured to the frame portion 1 and cross bars 12. Thus, when the sections B and C are assembled with the ends 2a received in the sleeves 11, the grill bars 4, 5, 6, 7, 8, 9, and 10, may be caused to lie on top of the cross bar 2 of the other section whereby the grill bars 4 to 10 of each section will all be in a common plane when the two sections B and C are assembled.

On the other hand, even though the grill sections B and C are assembled with the grill bars 4, 5, 6, 7, 8, 9 and 10 of both sections, all in the same plane not extending beneath the cross bars 12, the bottom loops of the handle members 13 will rest on the surface of the bottom of the pan or roaster as shown in Figure 1 to support the grill device A in a slightly upraised position, or the handles 13 may be swung around to positions reverse to those of Figure 1, thereby to cause the grill to lie with its other side down and slightly closer to the bottom of the roaster.

In the use of the device, when the sections B and C are in assembled condition and placed in the pan or roaster, as shown in Figure 1, the meat to be roasted or grilled may be emplaced upon the grill bars between the handles 13. When the cooking is finished the cooked meat may be raised up out of the roaster by grasping the handles 13 and then with the device A placed over a platter, the handle 13 may be manipulated to pull the sections B and C apart so as to withdraw the bars 2 from the telescoping relation with the sleeves 11 and cause the cooked meat to be deposited upon the platter in a very advantageous manner which does not involve breaking apart of the meat or grasping of the same by other means.

Having thus described my invention, what I claim as new and desire to secure by Letters Patent of the United States, is:

1. A cooking rack comprising two identical complemental grill sections, each grill section comprising a U-shaped structure including a side frame part consisting of a heavy wire member having its ends bent at a right angle to form grill bars at opposite ends thereof, a plurality of intermediate grill bars composed of heavy wire members secured at one end to said frame part in spaced parallel relation to the end grill bars, and a cross bar attached at its ends to the bent ends of the U-shaped structure, the cross bar of each grill section underlying and supporting the intermediate grill bars of the other grill section, and means on each section having telescoping relation with one of the grill bars on the other section.

2. A cooking rack as in claim 1, in which the intermediate grill bar adjacent one end grill bar is closely spaced relative thereto, the intermediate grill bars being equidistantly spaced a greater distance from one another and from the opposite end grill bar of the respective section, whereby when the sections are assembled in telescoping relation, the intermediate grill bars of one section will lie on top of the cross bars of the other section, so that the intermediate grill bars of both sections lie in alternating relation and in a substantially common plane.

3. A cooking rack as claimed in claim 1, wherein the intermediate grill bars of one grill section are slidable over and on the cross bar of the other section, and the free ends of the intermediate grill bars of one section are movable to rest on the frame part of the U-shaped structure of the other section.

4. A cooking rack as claimed in claim 1, wherein the intermediate grill bars of one grill section are slidable over and on the cross bar of the other section, and the free ends of the intermediate grill bars of one section are movable to rest on the frame part of the U-shaped structure of the other section, the intermediate grill bars of each grill section lying in substantially the same plane as those of the other section, and one of the bent end grill bar members of each grill section having a sleeve to receive the adjacent bent end grill bar of the other section to provide the telescopic means referred to.

MYRLE A. POTTS.

REFERENCES CITED

The following references are of record in the file of this patent:

UNITED STATES PATENTS

| Number | Name | Date |
|---|---|---|
| 728,067 | Young | May 12, 1903 |
| 893,671 | St. John | July 21, 1908 |
| 932,943 | Bagula | Aug. 31, 1909 |
| 1,006,328 | Widenhofer | Oct. 17, 1911 |
| 1,263,863 | Crosby | Apr. 23, 1918 |
| 1,271,326 | Kivlan | July 2, 1918 |
| 2,144,278 | Wallace | Jan. 17, 1939 |
| 2,469,698 | Morgan | May 10, 1949 |

FOREIGN PATENTS

| Number | Country | Date |
|---|---|---|
| 926 | Great Britain | Jan. 14, 1908 |
| 270,118 | Great Britain | May 5, 1927 |